June 1, 1948.  L. G. LEVOY, JR  2,442,609
CONDENSER CHARGE AND DISCHARGE SYSTEM
Filed March 20, 1941  2 Sheets-Sheet 2
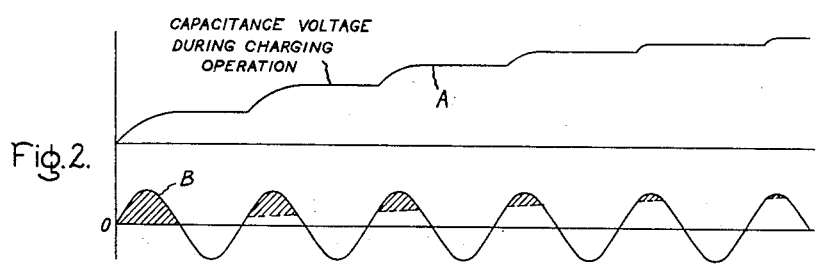
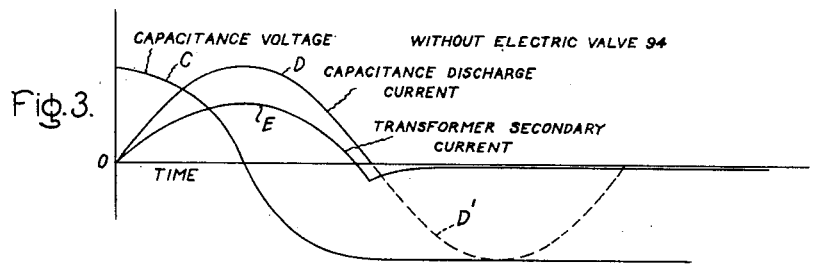
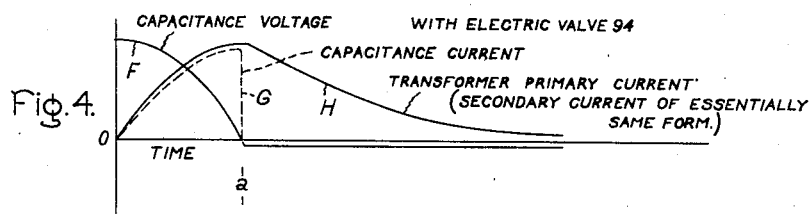
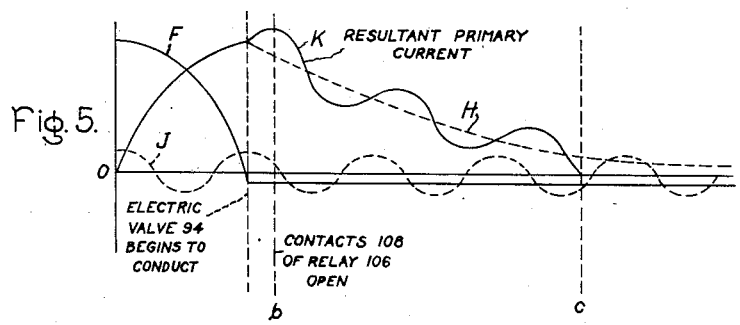
Inventor:
Louis G. Levoy Jr,
by Harry E. Dunham
His Attorney.

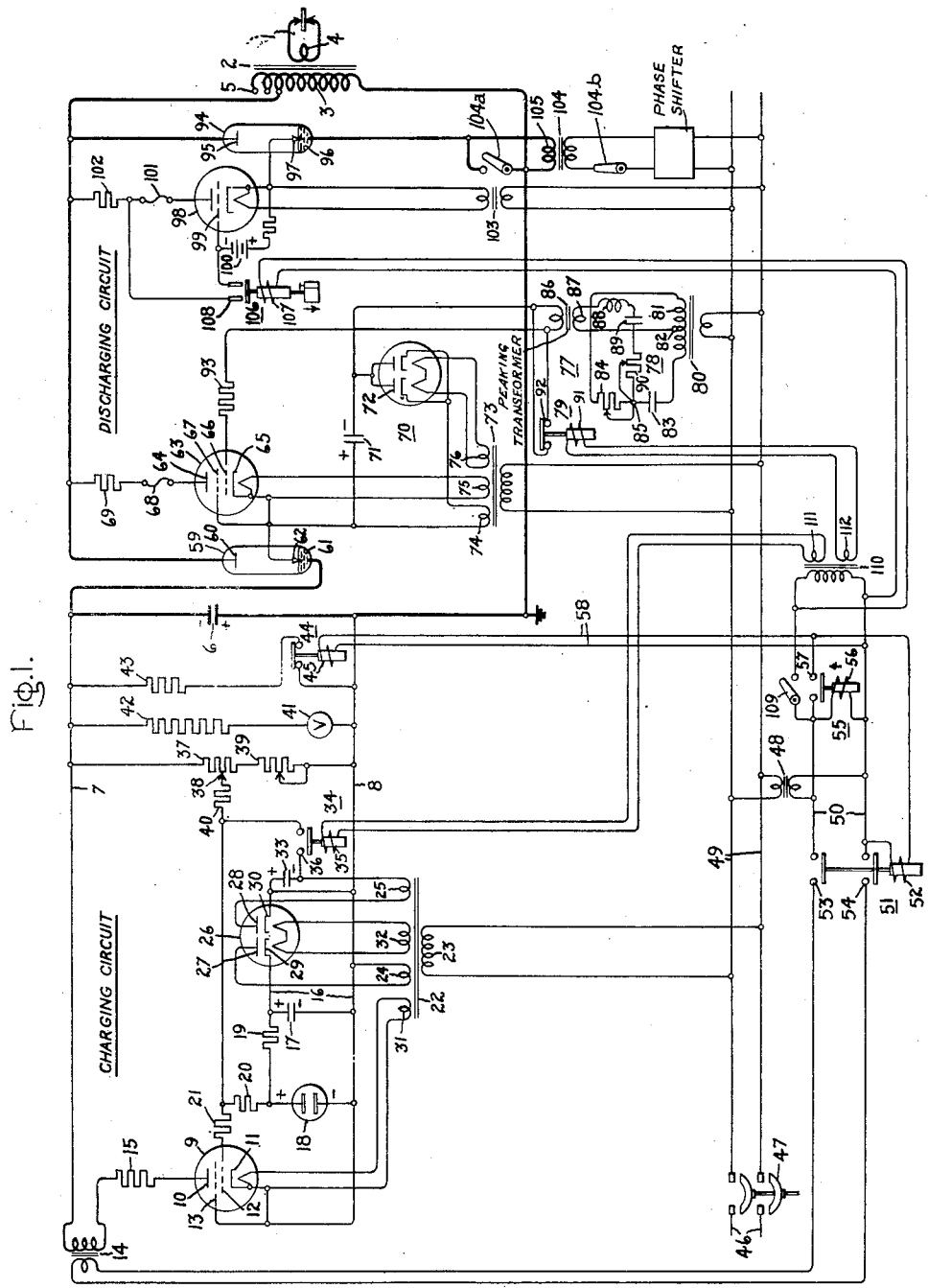

Patented June 1, 1948

2,442,609

UNITED STATES PATENT OFFICE 2,442,609

CONDENSER CHARGE AND DISCHARGE SYSTEM

Louis G. Levoy, Jr., Schenectady, N. Y., assignor to General Electric Company, a corporation of New York Application March 20, 1941, Serial No. 384,247

9 Claims. (Cl. 320—1)

My invention relates to electric control systems and more particularly to electric systems for transmitting current to a load circuit from a suitable supply circuit through, or by means of, electrostatic apparatus such as capacitances or condensers.

In some types of electric translating systems for energizing load circuits, such as welding circuits, it is frequently desirable to transmit to the load circuit a current of predetermined magnitude and predetermined duration, thereby controlling the amount of power transmitted to the load circuit during an accurately determinable interval of time. In accordance with the teachings of my invention described hereinafter, I provide a new and improved electric system whereby a predetermined amount of power is transmitted to the load circuit at a high rate and in which the apparatus affords material advantages in apparatus economy over that provided by the prior art arrangements.

It is an object of my invention to provide a new and improved electric control system.

It is another object of my invention to provide a new and improved electric translating system.

It is a further object of my invention to provide a new and improved translating system for energizing a load circuit through electrostatic energy storage apparatus.

It is a still further object of my invention to provide new and improved electric valve apparatus for energizing a load circuit from a suitable source of current, and in which electrostatic storage means, such as a capacitance, is charged and substantially discharged to effect energization of the load circuit.

Briefly stated, in the illustrated embodiment of my invention, I provide an electric translating system for transmitting an impulse of energizing current to a load circuit and which comprises an electrostatic energy storage means, such as a capacitance, which is discharged by means of electric discharge apparatus or electric valve means.

One feature of my invention described hereinafter is the provision of an improved circuit for charging the electrostatic storage means from a suitable source of current, and in which the charging circuit comprises an electric discharge device of the controlled type. Another feature of my invention described hereinafter relates to control apparatus for synchronizing operation of the charging circuit and the discharging circuit for the electrostatic energy storage means.

A still further feature of my invention is the provision of a control circuit for synchronizing the operation of an electric valve means connected across the primary winding of a power transformer which is connected between the electrostatic energy storage means and the load circuit to prevent a substantial reversal in polarity of the storage means, and in which a control circuit is employed for synchronizing the operation of the electric valve means relative to the operation of the discharge circuit.

For a better understanding of my invention, reference may be had to the following description taken in connection with the accompanying drawings, and its scope will be pointed out in the appended claims. Fig. 1 diagrammatically illustrates my invention as applied to a system for energizing a welding circuit, and Figs. 2–5, inclusive, represent certain operating characteristics of the arrangement shown in Fig. 1.

Referring now to Fig. 1 of the drawings, my invention is there illustrated as applied to a system for energizing a load circuit, such as a welding circuit 1. In systems of this nature it is frequently desired to transmit to the load circuit a single impulse of current in response to a predetermined controlling operation and to transmit a large amount of energy within a predetermined interval of time, thereby necessitating a limitation of the period during which current may be transmitted to the associated translating apparatus which effects energization of the load circuit. I employ a suitable transformer 2 having a primary winding 3 and a secondary winding 4 connected to the welding circuit 1. The primary winding 3 may be provided with a plurality of taps 5 which permit adjustment of the voltage and current of welding circuit 1.

I employ a suitable electrostatic energy storage means, such as a condenser or a capacitance 6, which is charged through a charging circuit and discharged through a discharging circuit, both of which are explained in detail hereinafter.

The charging circuit for the capacitance 6 may comprise a suitable source of current which is illustrated as being a direct current source including conductors 7 and 8 energized by means of an electric discharge device 9. The electric discharge device 9 is preferably of the high vacuum type comprising an anode 10, a cathode 11, a control grid 12 and may include a screen grid 13 which is preferably connected to the cathode 11. The source of current for energizing the anode-cathode circuit of electric discharge device 9 may be an alternating current source furnished by a transformer 14 which is energized through circuit controlling means or contactors described hereinafter. The electric discharge device 9 if desired may be of the type employing an ionizable medium, such as a gas or a vapor, and which employs a control member, such as a grid, energized by an excitation circuit, for controlling the conductivity thereof. Of course, it will be appreciated that the charging circuit may be energized by means of a bi-phase rectifier or a full-wave rectifier of the controlled type, and the control or excitation circuit described hereinafter may be applied to the control members of such a rectifier. A current limiting impedance element, such as a resistance 15, may be connected in series relation with the anode-cathode circuit of electric discharge device 9 and the secondary winding of transformer 14. If it is not desirable to use an additional impedance element, the transformer 14 may be designed to have a sufficient leakage reactance to limit the current flow.

A suitable voltage, such as a positive voltage, is impressed on the control grid 12, tending to maintain the electric discharge device in a conducting condition. This control voltage may be provided by means of an excitation circuit including a source of direct current 16 which charges a capacitance 17 to the polarity indicated. A substantially constant unidirectional voltage is maintained across the terminals of a glow discharge device 18, when it is in a conducting condition. The current limiting resistance 19 may be connected in series relation with the condenser 17 and the glow discharge device 18. The positive terminal of the glow discharge device 18 is connected to control grid 12 through resistances 20 and 21.

The source of direct current 16 may be furnished by a suitable rectifying circuit and may include a transformer 22 having a primary winding 23 and secondary windings 24 and 25. Secondary windings 24 and 25 are connected to discharge paths of an electric valve means 26 which provides two electric discharge paths by virtue of a pair of anodes 27 and 28 and a pair of cathodes 29 and 30. Transformer 22 may also be provided with secondary windings 31 and 32 which operate as sources of current for energizing the cathode heating elements of electric discharge device 9 and electric valve means 26.

The discharge path provided by anode 28 and cathode 30 is employed to produce a source of negative or holdoff voltage for the electric discharge device 9 by charging a capacitance 33, which may be selectively connected to or disconnected from the control grid 12 of electric discharge device 9 through a relay 34 having an actuating coil 35 and contacts 36.

I provide apparatus for controlling the conductivity of the electric discharge device 9 to effect charging of the capacitance 6 to a predetermined voltage and which maintains the voltage at this predetermined value at all times except during the intended period of discharge of the capacitance. This apparatus may comprise a voltage divider which is connected across the terminals of the capacitance 6 and which may include a resistance 37 having an adjustable contact 38 and a resistance 39. The resistance 39 may be of the adjustable type to establish the range of voltage control of the resistance 37. Adjustment of the contact 38 controls the voltage to which the capacitance 6 is charged. Contact 38 is connected to grid 12 and impresses thereon a voltage which is in opposition to the voltage impressed on grid 12 by means of glow discharge valve 18 and resistance 20. The voltage derived from the voltage divider, including resistances 37 and 39, is a negative voltage relative to the cathode 11, and the charging operation of the electric discharge device 9 is controlled by the relative magnitudes of the positive voltage and the negative voltage. A current limiting resistance 40 may be connected between the common juncture of resistances 20 and 21 and the movable contact 38. If it is desired to provide an indication of the magnitude of the voltage of capacitance 6, a voltmeter 41 may be connected across the terminals of capacitance 6. The current limiting resistance 42 may be connected in series relation with the voltmeter if desired.

One of the principal advantages of using the electrostatic energy storage system for supplying an impulse of current to a load circuit is the ability of such a system to transmit energy at a very high rate to the load circuit without imposing severe load conditions on the supply circuit. This advantage will be appreciated when it is considered that the capacitance may be charged at a rate which does not draw excessive current from the supply circuit, while permitting an abrupt or sudden discharge of the capacitance to transmit a large amount of power to the load circuit. However, in a system of this nature where the amount of power transmitted to the load circuit is determined by the charge of the capacitance, that is, by the energy stored in the capacitance, it will be appreciated that it is important to maintain the voltage of the capacitance precisely at a predetermined value so that the energy or power transmitted to the load circuit is accurately and precisely determinable and controllable. It will be observed further that any variation in the voltage of the capacitance from the desired value is reflected in a squared relationship since the amount of electrostatic energy in a capacitance is equal to: $\frac{1}{2} CE^2$, where C is equal to the capacitance in farads and E is the voltage. The charging circuit which I provide, including the electric discharge device 9 and the associated control circuit for maintaining the voltage of the capacitance 6 constant, operates precisely and accurately to maintain the voltage of the capacitance at a definite value so that the amount of power transmitted to the load circuit is definitely controllable.

In the prior art arrangements where the capacitance has been charged from a source of current, the resultant charge has been determined by the magnitude of the voltage of the alternating current circuit or of the direct current circuit which charges the capacitance. In the system which I provide, the transformer 14 is arranged to produce a voltage which is substantially greater in magnitude with respect to the final or desired voltage to which it is desired to charge the capacitance 6. In this manner, although the voltage of the source, which is the transformer 14, is a factor in determining the rate at which the capacitance 6 is charged, the final charge of the capacitance is determined not by the voltage of the source but is determined primarily by the control circuit which operates on grid 12 of electric discharge device 9. Furthermore, by establishing the voltage of the source which energizes the charging circuit at a value substantially above the final or desired voltage of the capacitance 6, I provide an arrangement which permits accurate control of the voltage of the capacitance independently of substantial variations in the magnitude of the voltage of the energizing source.

Adjustment of contact 38 associated with resistance 37 permits adjustment of the final charge or voltage which is maintained on capacitance 6. Of course, by this adjustment it is possible to control the amount of power transmitted to the welding circuit 1.

In some installations it may be desirable to provide a discharge or protective circuit across the terminals of the capacitance 6 and I provide such a circuit which may be employed for protective purposes and may be arranged to be in the normally closed or completed condition so that the capacitance 6 its uncharged when the apparatus is not in use. This circuit may comprise a resistance 43 and a relay or contactor 44 having an actuating coil 45. The operating circuit for the relay 44 is described hereinafter.

The source of current for energizing the direct current circuit 7—8, and the circuit for energizing transformer 14 may be derived from a suitable source of alternating current 46. Circuit controlling or interrupting means 47 may be connected to the circuit 46 to selectively energize and deenergize the complete system. An insulating transformer 48 may be connected between circuit 49 and circuit 50. A circuit controller or contactor 51, having an actuating coil 52 and contacts 53 and 54, is connected between circuit 50 and transformer 14 to effect energization of the charging circuit a predetermined interval of time after the closure of circuit controlling means 47. A time delay relay 55 is provided with an actuating coil 56 which is energized from circuit 46 through circuit controlling means 47 and circuits 49 and 50 upon closure of circuit controlling means 47. The time delay relay 55 is connected to close with a predetermined time delay, effecting energization of actuating coil 52 of contactor 51 after the cathode heating elements of the associated electric discharge apparatus have attained a predetermined safe operating temperature. Upon closure of contacts 57 of relay 55, actuating coil 45 of relay 44 is also energized through circuit 58 to remove the shunt protective path across the terminals of capacitance 6, which operation places the capacitance in condition to be charged by the charging circuit upon closure of contactor 51.

In order to discharge the capacitance 6 through primary winding 3 of transformer 2, thereby effecting the transmission of an impulse of current to the welding circuit 1, I provide an electric valve means 59 preferably of the type employing an ionizable medium, such as a gas or a vapor, and including an anode 60, a cathode 61 and a control member 62. The control member 62 may be of the immersion-ignitor type having an extremity thereof extending below the surface of the mercury pool cathode 61.

To control the conductivity of the electric valve means 59, I employ a control electric discharge device 63, also preferably of the type including an ionizable medium such as a gas or a vapor, which comprises an anode 64, a cathode 65, a control grid 66, and may include a shield member or second control member 67 preferably connected to the cathode 65. A suitable current protective means, such as a fuse 68 and a current limiting resistance 69, may be connected in series relation with the anode-cathode circuit of discharge device 63.

The electric discharge device 63, and hence the electric valve means 59, are maintained in a non-conducting condition except during the periods of discharge of the capacitance 6. The discharge device 63 and the electric valve means 59 may be maintained in a nonconducting condition by means of a control circuit 70 comprising a capacitance 71 which is charged to the polarity indicated by a rectifier 72 and a transformer 73. Transformer 73 is provided with a secondary winding 74 which is connected to the anode-cathode circuit of the rectifier 72 and capacitance 71. Transformer 73 may also be provided with secondary windings 75 and 76 which serve as sources of current for the cathode heating elements of electric discharge device 63 and rectifier 72.

As a means for rendering the electric discharge device 63 conducting and hence as a means for rendering the electric valve means 59 conducting, I provide a circuit 77 including the phase shifting circuit 78 and a relay 79 which, when the relay is energized, impresses on the control grid 66 of electric discharge device 63 a positive voltage sufficient to overcome the effect of the biasing potential produced by capacitance 71. Phase shifting circuit 78 may be of the static impedance type, that is, one in which an adjustable phase alternating voltage is furnished by suitable impedance elements and may include a transformer 80 having a secondary winding 81 provided with an electrical intermediate connection 82. One branch of the phase shifting circuit 78 includes a reactive element, such as a capacitance 83, and the other branch may include an adjustable resistance 84. The adjustable phase voltage is obtained from the common juncture 85 of capacitance 83 and resistance 84 and the intermediate connection 82, and this adjustable phase voltage is supplied to a suitable peaking device, such as a saturable peaking transformer 86, the primary winding 87 of which is connected to these two points through a suitable filtering arrangement which may comprise an inductance 88, a capacitance 89 and an adjustable resistance 90.

Relay 79 is provided with an actuating coil 91 and contacts 92 and is normally mechanically biased to the closed circuit position so that the peak voltage appearing across the secondary winding of transformer 86 is rendered ineffective, thereby permitting the biasing potential of capacitance 71 to maintain control electric discharge device 63 in a non-conducting condition. The secondary winding of transformer 86 is connected in series relation with a current limiting resistance 93 and the capacitance 71 between cathode 65 and control grid 66 of discharge device 63.

As a means for preventing substantial reversal in the polarity of the voltage appearing across primary winding 3 following the discharge of capacitance 6 and hence for limiting the magnitude of reverse voltage or charge of capacitance 6, I connect across the primary winding 3 of transformer 2 a unidirectional conducting device, such as an electric valve means 94, which is also preferably of the type employing an ionizable medium, such as a gas or a vapor, and which may include an anode 95, a cathode 96 and a control member 97 of the immersion-ignitor type. Electric valve means 94 is also provided with a control electric discharge device 98 which is preferably of the type employing an ionizable medium and which includes a control member or control grid 99. Electric discharge device 98 is normally maintained nonconducting by means of a suitable source of negative biasing or holdoff potential such as a battery 100. The electric discharge device 98 is connected to the anode-cathode circuit of its main associated electric valve means 94, and is connected between the anode 95 and the control member 97 through a circuit including a fuse 101 and resistance 102. A transformer 103 may be employed for supplying cathode heating current to the heating element of control electric discharge device 98.

I may employ means for accurately determining the interval of time during which the discharge current of capacitance 6 flows through the primary winding 3 of transformer 2. That is, I may employ means for precisely terminating the flow of current so that the discharge current of capacitance 6 is not maintained flowing for an extended period of time due to the inductance of the associated circuit which is furnished principally by transformer 2. This means for interrupting the flow of current may comprise a transformer 104 which is energized from circuit 49 and which has a secondary winding 105 connected in series relation with the anode-cathode circut of electrc valve means 94. The transformer 104 may be designed so that the unidirectional impulse of current or the circulating current transmitted therethrough does not impose an undesirable load condition on circuits 46 and 49. One way in which this may be accomplished is by designing the transformer 104 to have a core member provided with an air gap so that unidirectional saturation of the core structure is not obtained or is substantially limited. The alternating voltage introduced into the discharge cirtiut of electric valve means 94 naturally reverses polarity periodically and hence serves to render the cathode 96 positive relative to anode 95, effecting interruption of the current through the valve and precisely terminating the transmission of current through the transformer 2.

My system shown in Fig. 1 operates satisfactorily without the transformer 104 to effect energization of the welding circuit 1. Consequently, I provide suitable means, such as switches 104a and 104b, for selectively connecting and disconnecting the transformer 104 in the system. Switch 104a may be connected across secondary winding 105 to shunt this winding, and switch 104b may be connected in series relation with the primary winding. To operate the system without utilizing the transformer 104, switch 104a is closed and switch 104b is opened.

I provide controlling means, such as a phase shifting means or circuit connected between circuit 49 and transformer 104, for controlling or adjusting the phase of the alternating voltage introduced in circuit with electric valve means 94 and primary winding 3. In this manner, there is provided an arrangement which permits a timing or synchronizing adjustment of the time between the time of initiation of the discharge of capacitance 6 and the termination of the decaying current through primary winding 3. The phase shifting means may be adjusted to that phase angle which prevents the establishment of a transient due to the application of an alternating voltage to the circuit including primary winding 3 when electric valve means 94 begins to conduct.

As a means for controlling the electric discharge device 98 and electric valve means 94, I provide timing means such as relay 106. The relay 106 is of the time delay type comprising an actuating coil 107 and contacts 108. The relay 106 is designed to be biased to the open circuit position when the actuating coil 107 is deenergized, and is arranged to close its contacts 108 substantially instantaneously upon the energization of the actuating coil 107 and to maintain the contacts 108 closed for a predetermined definite interval of time, at the expiration of which the contacts 108 are opened and maintained open until the actuating coil 107 is deenergized. When the contacts 108 are closed, the grid 99 of electric discharge device 98 is connected to the anode-cathode circuit and is also connected to the anode 95 of electric valve means 94 through resistance 102.

I provide a timing or synchronizing means for determining the sequence of operation of the charging circuit and of the discharging circuit for capacitance 6. This means may comprise an initiating switch 109 which may be either manually operated or operated in response to a predetermined circuit controlling operation to energize a transformer 110 through circuits 46, 49 and 50. Transformer 110 may comprise a pair of secondary windings 111 and 112 which are connected to actuating coils 35 and 91 of relays 34 and 79, respectively. Closure of switch 109 simultaneously prevents operation of the charging circuit and initiates the operation of the discharging circuit. In addition, actuating coil 107 of relay 106 is energized by the closure of initiating switch 109 and contacts 108 of relay 106 are instantaneously closed and subsequently opened a predetermined interval of time after the closure of switch 109. An important aspect of the invention above described is the synchronization of the time of discharge of the capacitance 6 with respect to the interrupting voltage produced by transformer 104. The voltage of peaked wave form produced by transformer 86 synchronizes the time at which the discharge of capacitance 6 is initiated relative to the voltage of circuit 49 and thereby also determines the time at which the current through electric valve means 94 is interrupted for a particular initial value of voltage or charge of capacitance 6.

The operation of my invention will be explained by considering the system when it is connected to transmit a single impulse of energizing current to the welding circuit 1. Initially the capacitance 6 is not charged inasmuch as the contacts of relay 44 close the protective circuit around capacitance 6. Upon closure of the circuit controlling means 47, circuits 49 and 50 are energized immediately, effecting energization of relay 44 upon operation of relay 55. When relay 44 opens its contacts the protective discharge circuit around capacitance 6 is opened. When circuit controlling means 47 is closed a timing operation is initiated by the energization of relay 55 which closes its contacts 57 after the expiration of a predetermined interval of time sufficient to permit the cathodes of the electric valves to attain a safe operating temperature. That is, relay 55 delays closures of its contacts for an interval of time approximating three to five minutes and effects energization of actuating coil 52 of relay 51 which supplies anode-cathode potential to electric discharge device 9.

Capacitance 6 is then charged through electric discharge device 9. Inasmuch as the electric discharge device 9 conducts current during only the positive half cycles of applied anode-cathode voltage, impulses of current are transmitted only during the positive half cycle to charge capacitance 6 to the polarity indicated. The rate at which the capacitance 6 is charged, is of course, determined by the time constant of the circuit including capacitance 6, transformer 14 and resistance 15.

The operating characteristics shown in Fig. 2 may be used in order to explain the manner in which the electric discharge device 9 charges capacitance 6. Curve A represents the rise in voltage across capacitance 6 as it is charged during positive half cycles of anode-cathode voltage. The shaded portions of curve B represent the period of conduction of the electric discharge device 9 during the charging operation. It will be observed that as the capacitance is charged, the electric discharge device 9 transmits progressively smaller amounts of current and for progressively smaller periods of time during each half cycle. This is due primarily to the fact that the negative component of voltage which is derived from the terminals of capacitance 6, and which is impressed on grid 12 through resistance 37, progressively increases in magnitude as the voltage of the capacitance approaches the predetermined final value. This increased negative voltage operates against the positive voltage produced by glow discharge device 18 and as the voltage approaches and reaches the desired value electric discharge device 9 is rendered nonconducting. I have operated the system by charging the capacitance 6 to voltages in the neighborhood of 3,000 volts and have found that if the system is not continually operated by frequent discharge of the capacitance 6 there is a tendency for some of the charge of the capacitance to leak off. Naturally, the charging circuit must operate to restore this decrement of charge. The charging circuit operates to supply the additional current to maintain the voltage of the capacitance at the desired value. If the voltage tends to decrease, the negative component of voltage correspondingly decreases and the electric discharge device 9 will be caused to transmit a current tending to restore the charge to the desired value. No current is transmitted to the primary winding 3 from the charging circuit, capacitance 6 or transformer 104 because electric valve means 59 is nonconducting and because electric discharge device 98 and electric valve means 94 are maintained in a nonconducting condition by the negative biasing voltage provided by battery 100 is impressed on grid 99.

The system is now in condition for supplying an impulse of current to the welding circuit 1. This operation may be effected by closing switch 109. Upon closure of switch 109, relays 34 and 79 are operated simultaneously so that the capacitance is discharged through primary winding 3 of transformer 2, and the charging circuit is prevented from operating during the discharge period. By maintaining the discharge device 9 in a nonconducting condition, it will be appreciated that the charging circuit is open, thereby preventing transfer of current from the charging circuit to the discharge circuit or primary winding 3. When contacts 36 of relay 34 are closed by the energization of actuating coil 35, the negative voltage of capacitance 33 is impressed on the control grid and the magnitude of this negative biasing potential is sufficient in itself to overcome the effect of the positive voltage produced by glow discharge device 18.

When relay 79 is operated by closure of the initiating switch 109, its contacts 92 open the shunt circuit across the terminals of the secondary winding of peaking transformer 86 at the desired time. The first positive impulse of voltage from the peaking transformer, after the opening of contacts 92, is impressed on control grid 66 of electric discharge device 63, thereby rendering the discharge device conducting at a predetermined time during the cycle of the alternating voltage of circuit 49. A positive impulse of current is transmitted to control member 62 of electric valve means 59, rendering the electric valve means conducting and effecting discharge of capacitance 6 through a circuit including the primary winding 3 of transformer 2. The closure of initiating switch 109 also initiated another timing operation through time delay relay 106. Immediately upon closure of initiating switch 109, actuating coil 107 of relay 106 is energized, effecting instantaneous closure of contacts 108 so that grid 99 is connected to its anode-cathode circuit, thereby neutralizing the holdoff potential of battery 100. As soon as the voltage across the primary winding 3 reverses polarity, electric discharge device 98 is rendered conducting effecting the transmission of an impulse of current to control member 97, thereby rendering electric valve means 94 conducting.

It will be understood that until the voltage across the primary winding 3 tends to reverse in polarity, neither electric discharge device 98 nor electric valve means 94 conducts current because the polarity across the principal electrodes of these electric valves is the reverse of that required to permit conduction. However, as soon as the voltage tends to reverse or reverses to a sufficient magnitude determined by the arc initiating voltage, electric discharge device 98 is rendered conducting through contacts 108 which are in the closed circuit position and an impulse of current is transmitted to control member 97. Consequently, electric valve means 94 is rendered conducting, effecting commutation of current from electric valve 59, and providing a path for the flow of circulating current through a circuit including primary winding 3, the anode-cathode circuit of electric valve means 94 and secondary winding 105 of transformer 104. When electric valve 94 becomes conducting, electric valve 59 is rendered nonconducting. The reason for this circulating current will be appreciated when it is considered that the flow of current through the inductance, which in this case is furnished by transformer 2, represents stored electromagnetic energy which must be dissipated. When the electric valve means 94 is rendered conducting, the current continues to flow through primary winding 3 in the same direction, thereby preventing a substantial reversal in polarity of the voltage across winding 3. At some time immediately subsequent to the slight reversal in polarity, contacts 108 of relay 106 are opened and the biasing potential of battery 100 becomes effective. Appreciable current does not flow through the electric discharge device 98 in view of the fact that the impedance of its associated anode-cathode circuit is substantially greater than that of electric valve means 94, and the principal portion of the current flows through the electric valve means 94. However, it is desirable to have the electric discharge device 98 in a condition which permits it to assume control as soon as the current is interrupted. As the discharge current of capacitance 6 decreases to a magnitude sufficiently small so that the alternating voltage produced by transformer 104 is capable of reducing the current to the zero value, the period of energization of the welding circuit 1 and the transformer 2 is precisely and definitely ended. In this manner, the amount of energy and the time of supplying the unidirectional impulses are determined precisely.

The operation of the system during the discharge period may be more fully explained by referring to the operating characteristics shown in Figs. 3 and 4. The characteristics of Fig. 3 represent the operation of the system as it would behave without the use of the electric valve means 94. These curves represent certain characteristics of the welding system when the transformer 104 is not connected in the system, that is, when the switch 104a is closed and switch 104b is open. Curve C represents the capacitance voltage. If the capacitance discharge is initiated at zero time, its voltage would reverse upon discharging in the manner indicated, the magnitude of the reverse polarity voltage being substantially the same as that of the first half-cycle of a damped oscillation. The solid portion of curve D represents the capacitance current which would flow under these conditions. However, since the electric valve means 59 is unidirectional in its conducting characteristics, the current will not flow in the reverse direction. If the electric valve means 59 were of the type which included a reversely poled discharge path, the current would tend to reverse its direction of flow as indicated by the dotted curve D'. However, this condition does not exist and the dotted curve D' merely indicates the tendency of the circuit. Curve E represents the current which flows through the secondary winding of transformer 2, and includes the effect due to the exciting current. It will be observed that due to the stored magnetic energy, the current tends to decrease asymptotically to the horizontal or time axis and, therefore, the period of time required for the weld is considerable.

In certain welding circuits which require rapid operation, it will be appreciated that the presence of this exponential decay of current for a long period of time is undesirable because it causes sparking at the welding contacts if opened before the current is made to disappear completely. As a result, it is sometimes desirable to provide means for substantially shortening the amount of time for decreasing the welding period and to force a rapid decrease in the primary and secondary current of the welding transformer. When such rapid operation is desired, the transformer 104 may be employed by connecting the transformer effectively in the circulating path. This, of course, may be effected by opening switch 104a and closing switch 104b. The operating characteristics shown in Fig. 4 represent certain characteristics of the system when the transformer 104 is employed to shorten the welding period.

The solid curve F of Fig. 4 represents the capacitance voltage when the electric valve means 94 is employed. It will be noted that the capacitance charge and voltage reverse at time a and remain substantially constant thereafter. This phenomenon is due to the fact that as the voltage does reverse to a value sufficient to maintain conduction in the electric valve means 94, the arc drop maintains this component of voltage substantially constant, at a value in the region of 20 volts. The dotted curve G represents the capacitive current, indicating that the current through the capacitance does not reverse.

The manner in which the alternating component of voltage introduced in circuit with electric valve means 94 operates to end accurately and precisely the flow of current as illustrated by the operating characteristics shown in Fig. 5. Curve H represents one component of current in primary and secondary windings of transformer 2; and curve J represents the alternating voltage produced by transformer 104. Curve K represents the resultant current flowing through primary winding 3 of transformer 2. As soon as electric valve 94 begins to conduct current, that is upon reversal of the polarity of the voltage appearing across winding 3, the alternating voltage produced by transformer 104 becomes effective to modulate the current as indicated by curve K. At time c, it will be observed that the resultant current curve K intersects the zero axis and that the current is consequently interrupted because reverse current cannot flow through electric valve means 94. Upon interruption of the current, or the exponentially decaying primary current, transformer secondary current is also more rapidly brought to zero, permitting operation of the welding contacts without incurring sparking. In this manner the welding operation may be substantially expedited.

Relative to the operating characteristics shown in Figs. 4 and 5, it is to be observed for the purposes of analysis that the exciting current for the transformer 2 is neglected. Consequently, the primary and secondary currents of the transformer 2 will have the same general wave shape although in reality the magnitudes of the primary and secondary currents will be different, depending, of course, upon the transformer turn ratio.

The operating characteristics shown in Fig. 5 may also be used to explain more fully the timing operation of the relay 106. Relay 106 is timed so that its contacts 108, which are initially open, are closed at time zero and are opened at about time b so that ample time is provided for the electric discharge device 98 to assume control, that is, to be maintained non-conducting as soon as the current is decreased to the zero value. Accordingly, it is appreciated that time delay relay 106 is adjusted to maintain its contacts closed from the time of initiation of the discharge to time b indicated on the drawing. Of course, relay 106 may open its contacts any time after valve 94 begins to conduct to time c.

So long as the initiating switch 109 is maintained in the closed circuit position, relays 34, 79 and 106 are each maintained in the energized condition so that only one impulse of current is transmitted to the load circuit for a single operation of switch 109. Upon moving switch 109 to the open circuit position, relays 34, 79 and 106 are deenergized, placing the system in condition for subsequent operation; that is, the charging circuit begins to operate effecting charge of capacitance 6. This operation takes place within a short interval of time and the above described sequence of operation may again be initiated by closure of switch 109.

Adjustment of the phase shifting circuit 78 controls the phase of the voltage of peaked wave form produced by transformer 86 relative to the alternating voltage of circuit 49 and, hence, controls the time during a cycle of alternating voltage at which the discharge of capacitance 6 is initiated. By virtue of this relationship, circuit 78 also determines the exact duration of the discharge period and, hence, determines the energization period of the primary winding 3 through the synchronizing action of the alternating voltage introduced in the circulating path by means of transformer 104.

An important advantage of apparatus built in accordance with my invention is the apparatus economy which is obtained by subjecting the capacitance 6 to a substantially unidirectional voltage. It will be appreciated by those skilled in the art that the rating of the capacitance is substantially reduced when its polarity is reversed at frequent intervals. This is particularly true where the reverse polarity voltage is of substantially the same magnitude as the direct polarity voltage. I have found that my system operates very satisfactorily when it is charged to an initial or direct polarity of substantially three thousand volts. Upon discharge, the reverse polarity voltage does not increase beyond an instantaneous value of one hundred volts. As soon as electric valve 94 begins to conduct, the reverse voltage is reduced to substantially the arc-drop and the component of voltage due to transformer 104. When switch 104a is closed, the reverse voltage is the arc-drop voltage which is substantially 20 volts. By limiting the magnitude of the reverse voltage, I obtain a larger power output from a capacitance of given dimensions.

It is to be understood that my above described system may be operated without the use of the transformer 104 to transmit an impulse of current to the welding circuit 1 by the discharge of capacitance 6 through the electric valve means 59. Although the system, when the transformer 104 is not employed, necessitates a longer welding time due to the exponential decay of current through the primary winding 3 and the shunt electric valve means 94, it nevertheless operates entirely satisfactorily for those applications where extreme rapidity of operation is not essential.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a supply circuit, a load circuit, electric translating apparatus for energizing said load circuit comprising a capacitance, means for charging said capacitance from said supply circuit, a transformer having a primary winding and a secondary winding connected to said load circuit, an electric valve means connected in series relation with said capacitance and said primary winding for discharging said capacitance through said primary winding, said electric valve means having a control member, a control circuit for supplying an energizing impulse of current to said control member to render said electric valve means conducting, a second electric valve means connected across at least a portion of said primary winding for by-passing the first mentioned electric valve means and said capacitance to limit the build-up of reverse voltage across said capacitance, means for introducing in series relation with said second electric valve means a voltage to expedite the rate of decay of the primary winding current, initiating means for controlling said control circuit to effect energization of said load circuit, and means controlled by said initiating means for timing the operation of said second electric valve means with respect to said voltage.

2. In combination, a supply circuit, a capacitance, a charging circuit for said capacitance, a discharge circuit for said capacitance including a transformer having a primary winding and electric valve means, initiating means for rendering said electric valve means conducting to effect discharge of said capacitance through said primary winding, an electric valve means connected across said primary winding for preventing substantial reversal in the polarity of the voltage of said capacitance, and timing means responsive to said initiating means for controlling the conductivity of the second mentioned electric valve means.

3. In combination, a source of current, a load circuit, a capacitance, a circuit for charging said capacitance from said source, a discharge circuit for said capacitance comprising a transformer having a primary winding and a secondary winding connected to said load circuit, electric valve means connected in series relation with said primary winding across said capacitance, means for rendering said electric valve means conducting to effect energization of said load circuit, a second electric valve means connected across at least a portion of said primary winding, said second electric valve means having a control member, means for impressing a negative voltage on said control member to maintain said second electric valve means nonconducting and means for energizing said control member to render said second electric valve means conducting as soon as the voltage of said capacitance tends to reverse polarity.

4. In combination, a capacitance, a charging circuit for said capacitance, a discharge circuit for said capacitance comprising a transformer having a primary winding, an electric valve connected across at least a portion of said primary winding, means for initiating discharge of said capacitance through said discharge circuit, means normally tending to maintain said electric valve nonconducting, and means responsive to the initiating means for controlling the last mentioned means to permit conduction by said electric valve means as soon as the voltage of said capacitance tends to reverse polarity at the end of its discharge period.

5. In combination, a source of current, a capacitance, a charging circuit for said capacitance, a discharge circuit for said capacitance including a transformer, said transformer having a primary winding connected in said discharge circuit and having a secondary winding, a load circuit connected to said secondary winding, initiating means for effecting discharge of said capacitance through said primary winding, electric valve means connected across at least a portion of said primary winding, said electric valve means having a control member, a control circuit connected to said control member and comprising means for normally maintaining said electric valve means nonconducting, and timing means responsive to said initiating means for controlling the conductivity of said electric valve means to permit conduction thereby during a predetermined interval of time after the initiation of discharge of said capacitance.

6. In combination, a source of current, a capacitance, a charging circuit for said capacitance, a transformer having a primary winding connected in said discharge circuit and having a secondary winding, a load circuit connected to said secondary winding, unidirectional conducting means connected across at least a portion of said primary winding and including a control member which controls the transmission of current therethrough, a control electric discharge device, having a grid, for energizing said control member to render said electric valve means conducting, means for impressing a hold-off potential on said grid, initiating means for effecting discharge of said capacitance through said primary winding, and means responsive to said initiating means for immediately neutralizing said hold-off potential and for rendering said holdoff potential again effective a predetermined interval of time after the initiation of said discharge device.

7. In combination, a source of current, a capacitance, a charging circuit for said capacitance, a transformer having a primary winding connected in said discharge circuit and having a secondary winding, a load circuit connected to said secondary winding, unidirectional conducting means connected across at least a portion of said primary winding and including a control member which controls the transmission of current therethrough, a control electric discharge device, having a grid, for energizing said control member to render said electric valve means conducting, means for impressing a holdoff potential on said grid, initiating means for effecting discharge of said capacitance through said primary winding, and means for controlling the potential of said grid comprising a relay including an actuating coil and normally open contacts, the energization of said actuating coil effecting substantially instantaneous closure of said contacts for a predetermined interval of time at the expiration of which the contacts are again opened and maintained in the open circuit position so long as the actuating coil is energized.

8. In combination, a capacitance, a charging circuit for said capacitance, a discharge circuit for said capacitance comprising a transformer having a primary winding, an electric valve connected across at least a portion of said primary winding to limit the build-up of reverse voltage across said capacitance, an alternating current supply circuit, means for introducing in series relation with said electric valve an alternating voltage of said supply circuit, means for initiating the discharge of said capacitance through said discharge circuit at a predetermined time on the voltage wave of said supply circuit, and means for adjusting the phase of said alternating voltage in series with said electric valve relative to the alternating voltage of said supply circuit.

9. In combination, an alternating current supply circuit, a load circuit, electric translating apparatus for energizing said load circuit comprising a capacitance, means for charging said capacitance from said alternating current supply circuit, a transformer having a primary winding and a secondary winding connected to said load circuit, an electric valve means connected in series relation with said capacitance and said primary winding for discharging said capacitance through said primary winding, said electric valve means having a control member, means for applying a control voltage to said control member which will render said electric valve means conducting, means for adjusting the time of application of said control voltage relative to the alternating voltage of said supply circuit, a second electric valve means connected across at least a portion of said primary winding for by-passing the first mentioned electric valve means and said capacitance to limit the build-up of reverse voltage across said capacitance, means for introducing an alternating voltage of said supply circuit in series relation with said second electric valve means, and means for adjusting the phase of said alternating voltage in series relation with said second electric valve means relative to the alternating voltage of said supply circuit.

LOUIS G. LEVOY, Jr.

REFERENCES CITED

The following references are of record in the file of this patent:

UNITED STATES PATENTS

| Number | Name | Date |
| --- | --- | --- |
| 1,917,418 | Almquist et al. | July 11, 1933 |
| 1,933,976 | Hanson | Nov. 7, 1933 |
| 2,085,100 | Knowles et al. | June 29, 1937 |
| 2,110,015 | Fitzgerald | Mar. 1, 1938 |
| 2,113,220 | Power | Apr. 5, 1938 |
| 2,147,472 | Ulrey | Feb. 14, 1939 |
| 2,179,105 | Sidney | Nov. 7, 1939 |
| 2,235,385 | Rava | Mar. 18, 1941 |
| 2,250,102 | Klemperer | July 22, 1941 |